June 6, 1967   L. A. WARNER   3,323,718

COMPUTER FOR DECIMAL LOCATION

Filed Aug. 26, 1965

INVENTOR
LOUIS A. WARNER
BY Dominik & Stein
ATTORNEYS

United States Patent Office 3,323,718
Patented June 6, 1967

3,323,718
COMPUTER FOR DECIMAL LOCATION
Louis A. Warner, 5223 N. Natoma Ave.,
Chicago, Ill. 60656
Filed Aug. 26, 1965, Ser. No. 482,738
3 Claims. (Cl. 235—64.3)

This invention relates to computers and more particularly to mechanical devices for use in conjunction with slide rules for determining the decimal value of mathematical equations.

It is generally well known that a slide rule can be used for performing mathematical operations quickly and easily. The accuracy is, of course, dependent upon the ability of the person. Most of the errors made are usually in determining the location of the decimal point in the answer. This is generally done by mental approximation. For example, in solving a mathematical equation such as $$\frac{29.5 \times 0.012 \times 0.0006}{3.21 \times 672 \times 0.0000712}$$

the problem can be thought of as $$\frac{30 \times 0.010 \times 0.0006}{3 \times 700 \times 0.00007}$$

Multiplying the factors in the numerator and denominator by 10,000 the following is obtained.

$$\frac{30(10^4) \times 100 \times 6}{3(10^4) 700(10^4) \times .7}$$

Cancelling the $(10^4)$ in both the numerator and denominator and multiplying the factors in both results in the following:

$$\frac{1.8(10^4)}{1470(10^4)}$$

or approximately $$\frac{1.8}{1.5(10^3)}$$

The approximate answer can now be determined as $1.2 \times 10^{-3}$ or 0.0012. In solving the equation on a slide rule, the result or digits read are 1381. The actual answer is therefore 0.001381.

The above problem can be approximated in other ways but, in any case, it can be seen that it is a rather cumbersome task, particularly if done mentally without the help of paper and pencil. Furthermore, it is time consuming.

Another method advanced uses the number of digits making up a whole number, with a minus sign used to indicate the number of zeros before the first significant figure in a decimal fraction, (e.g. the number 621 has a "span" of 3 while the number .00621 has a "span" of —2) in conjunction with the projection of the slide portion of a slide rule to the right and to the left to determine the placement of the decimal point. The method of using the projections is as follows.

When the slide projects to the left:

(a) In multiplying, add the spans of the numbers multiplied together to find the span of the product.
(b) In dividing, subtract the spans of the numbers in the divisor from span or sum of the spans in the dividend.

When the slide projects to the right.

(a) In multiplying, add the spans of the numbers multiplied together but subtract 1 for every right-hand projection of the slide.
(b) In dividing, subtract the spans of the numbers in the divisor from the span or sum of the spans in the dividend, but add 1 for each right-hand projection of the slide.

The mathematical equation set forth above is solved, using this latter method, as follows: Dividing 29.5 by 3.21, the slide portion extends to the left and under the right index of the C scale the number 92 is read. An "L" is noted below the number 3.21.

The hairline of the cursor is moved over 12 on the C scale and the product of 92 times 12 is read on the D scale as approximately 11. The slide portion still extends to the left so an "L" is noted above the number 12.

Next the number 672 on the C scale is moved under the hairline. The slide portion extends to the left so another "L" is noted below the number 672. The quotient is 164.

The quotient 164 is to be multiplied by 0.0006 so the slide portion must be moved to place its left index over 164 on the D scale. The hairline is placed over the number 6 on the C scale, and the product is read as 985. The slide portion extends to the right so an "R" is noted above the number 0.0006.

The product 985 is now divided by moving the number 712 on the C scale under the hairline, with the quotient being read under the left index of the C scale as 1381. The slide portion projects to the right so an "R" is noted below the number 0.0000712. The problem will appear on paper as follows:

$$\frac{29.5 \times 0.012^L \times 0.0006^R}{3.12_L \times 672_L \times 0.0000712_R}$$

The spans are $$\frac{2+(-1)+(-3)}{1+3+(-4)} = \frac{-2}{0} = -2$$

and the span of the solution is therefore —2. The correct answer is determined to be .001381.

It may be noted that this method is also cumbersome in that the span of each number must be determined and, in addition, the direction in which the slide portion projects during each calculation must be observed and noted.

Using the mechanical device of the present invention, problems like that set forth above can be easily and quickly solved, using a minimum of mental approximation. Accordingly, it is an object of the present invention to provide mechanical devices for determining the decimal value of mathematical equations.

It is a further object of the present invention to provide mechanical devices for determining the decimal value of mathematical equations which are simple in construction and virtually maintenance free.

It is a still further object of the present invention to provide mechanical devices for determining the decimal value of mathematical equations which are simple in operation, so that the correct position of a decimal point can be easily and quickly determined.

Other objects of the invention will in part be obvious and will in part appear hereinafter.

The mechanical device of the present invention, hereinafter called a computer, generally comprises a body portion which has an index and two scales that increase in series, in opposite directions, from said index, and a slide portion which has pencil-point size apertures therein corresponding in number to the digits in each of the two scales and positionally aligned with respective ones of said digits. A similar aperture is formed in the body portion, in a fashion such that a pencil-point can extend through it and any one of the apertures in the slide portion. The slide portion has legends on it, indicating the manner in which it should be moved, to solve a particular problem or problems. The body portion likewise has legends for determining the solution.

More specifically, the computer is used to determine the correct position of a decimal point, by transforming each of the individual numbers of a problem to a single digit number, between one and ten, times a power of ten. For example, in the case of the number 0.0006 in the problem set forth above, it is transformed to $6 \times 10^{-4}$. The power of ten corresponds to the "correction factor" applied to the computer, for each number of the problem. This is done by placing a pencil point or the like in the correspondingly numbered aperture in the slide portion, and the slide portion moved until the pencil point also engages and extends through the aperture in the body portion. By manipulating the slide portion in this manner, in accordance with the legends on the computer, the correct position for the decimal place can be easily and quickly determined.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which.

Similar reference characters refer to similar parts throughout the several views of the drawing.

Figures 1, 2:
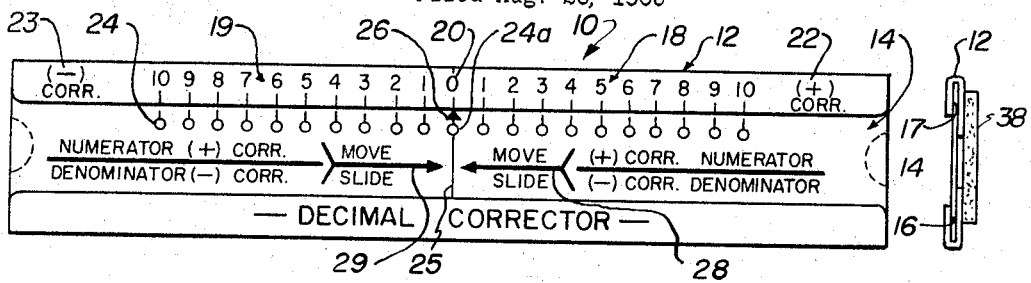
FIGURE 1 is a top plan view of a computer exemplary of a first embodiment of the invention.
FIGURE 2 is an end view of the computer of FIGURE 1.
Figure 3:
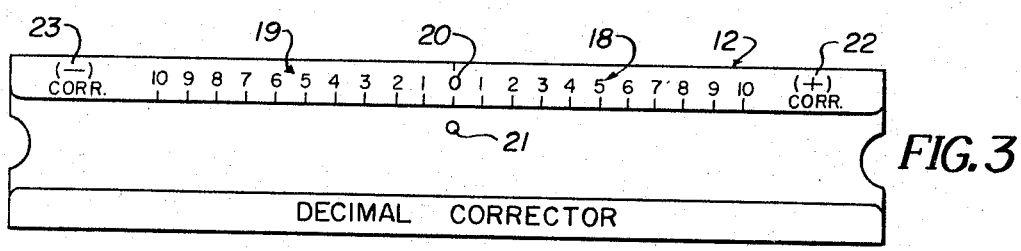
FIGURE 3 is a top plan view of the body portion of the computer of FIGURE 1.
Figure 4:
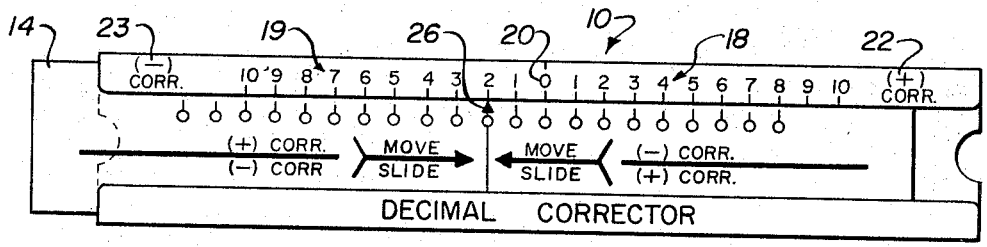
FIGURE 4 is a top plan view of the computer of FIGURE 1, illustrating the slider portion as it may appear after being manipulated.

Referring now to the drawing, there is shown a computer 10 having a body portion 12 and a slide portion 14, each of which may be formed of cardboard, plastic, metal or any material having some rigidity. The body portion 12 of the illustrated computer is formed from a single sheet of material which is folded along its two longitudinal edges to provide two parallel guide slots 16 and 17 for the slide portion 14. It could be formed with separate elements which are secured to one another to form the guide slots 16 and 17 as well. The guide slots 16 and 17 are formed so as to slidably retain the slide portion 14 therein, but with sufficient frictional contact between the slide portion 14 and the guide slots so that the slide portion is held in a substantially fixed position when it is longitudinally adjusted.

A pair of scales 18 and 19 are provided along the top edge of the body portion 12, which increase in series to the right and to the left of an index 20, respectively. In the illustrated case, the index 20 is the numeral 0. The scales 18 and 19 may have any number of equally spaced digits, however, it is found that scales having the digits 1 to 10 in increasing series are satisfactory for most purposes. A plus reference marker 22 and a minus reference marker 23 is placed on the body portion 12, adjacent the ends of the scales 18 and 19, respectively. An aperture 21 is formed in the body portion 12, in alignment with the index 20. The aperture 21, as explained below, is of sufficient diameter to receive a pencil point, the tip of a ball point pen, or the like therein.

The slide portion 14 has a plurality of apertures, generally indicated by the reference numeral 24, formed therein, each of which is positionally lined with one of the digits of the scales 18 and 19. The apertures 24 are also aligned with the aperture 21 in the body portion 12 so that an object such as a pencil point can be passed through one of the apertures 24 and the aperture 21. A reference line 25 extends across the width of the slider portion 14 and bisects the aperture $24_a$ which is aligned with the index 20 on the body portion 12. An index 26 which may be an arrowhead, as illustrated, is formed on the reference line 25 between the aperture $24_a$ and the index 20. On opposite sides of the reference line 25 are two indicators 28 and 29 which may be in the form of arrows extending in opposite directions towards the reference line 25. Above and below the indicator 29 respectively is the legend "Numerator (+) Correction" and "Denominator (−) Correction." Above and below the indicator 28 are the respective legends "Numerator (−) Correction" and "Denominator (+) Correction." The legends "Move Slide" can also be provided on opposite sides of the reference line 25, adjacent the indicators 28 and 29, to indicate the direction in which the slider portion 14 should be moved to calculate the decimal correction factor, in the manner described below.

To illustrate how the computer 10 is used, the problem set forth below, namely:

$$\frac{29.5 \times 0.012 \times 0.0006}{3.21 \times 672 \times 0.0000712}$$

is solved as follows.

Initially, the problem may be thought of as $$\frac{3 \times 1 \times 6}{3 \times 7 \times 7} = \frac{18}{147}$$

It may be noted that the value of each number is completely ignored, and only the first significant digit is approximated to a number between one and ten. The approximated numbers in the numerator and denominator are multiplied to obtain the respective products. Since only single digit numbers less than ten are being mentally observed, and multiplied, the required mental approximation is much simpler than that required with the first described method.

Upon observation, it is readily apparent that the value of the first digit of the quotient of the approximation is 0.1. It is therefore mentally noted that the answer computed using the slide rule is 0.(N), where N is a number between one and ten.

It may be recalled that the number observed on the slide rule in solving the above problem is 1381. From the mental note we made, we therefore know that the slide rule answer is .1381.

To determine the correct answer, each of the different numbers in the problem is observed and mentally transformed to a single digit number between one and ten, times a power of 10. For example, the number 29.5 is mentally observed to be $2.95 \times 10^1$; the number 0.0006 to be $6 \times 10^{-4}$. This also is easily done mentally. In fact, in most cases it can be determined by merely observing the number. The mental process in performing the function is spontaneous. The power of ten corresponds to the correction factor for each of the individual numbers which is applied to the computer 10.

A step-by-step description of the manipulation of the computer is as follows:

(a) 29.5 is mentally noted to be $2.95 \times 10'$. The correction factor is therefore $+1$, and a pencil point is placed in the aperture 24 aligned with the numeral 1 of the scale 19, in accordance with the legend "Numerator $(+)$" on the slide portion 14. As indicated, the slide portion is moved to the right, until the pencil point engages and extends through the aperture 21 in the body portion 12.

(b) 0.012 is next mentally noted to be $1.2 \times 10^{-2}$. The correction factor is therefore $-2$ and a pencil point is placed in the aperture 24 aligned with the numeral 2 of the scale 18, again in accordance with the legend "Numerator $(-)$" on the slide portion 14. The slide portion is moved to the left, as indicated, until the pencil point again engages the aperture 21.

(c) 0.0006 is mentally noted to be $6 \times 10^{-4}$. The $-4$ correction factor is computed by placing a pencil point in the aperture 24 aligned with the numeral 4 of the scale 18, and moving the slide portion to the left to engage the pencil point in the aperture 21.

(d) 3.21 is already a number between one and ten, hence no correction factor need be applied.

(e) 672 is mentally noted to be $6.72 \times 10^2$. The correction factor is $+2$. It is applied by placing a pencil point in the aperture 24 aligned with the numeral 2 of the scale 18, in accordance with the legend "Denominator $(+)$," and moving the slide portion to the left until the pencil point engages in the aperture 21.

(f) 0.00007 is mentally noted to be $7 \times 10^{-5}$. The $-5$ correction factor is applied by placing the pencil point in the aperture 24 aligned with the numeral 5 of the scale 19. The slide portion is moved to the right, to engage the pencil point in the aperture 21.

When the slide portion 14 has been manipulated in the above described manner, it will be observed that the index 26 points to the numeral 2 of the scale 19. Looking to the left of the scale 19 the $(-)$ indicator is observed, indicating that the correction factor is $-2$, or $10^{-2}$. Applying this correction factor to the slide rule answer .1381, it is determined that the correct answer to the problem is .001381.

From the above description, it is apparent that the correct decimal point location can be determined for any mathematical equation, simply by following the outlined steps. The decimal value of the slide rule answer is initially determined by ignoring the numerical value of the numbers and merely mentally determining the product of each single digit number between one and ten, in the numerator and denominator, and the approximate numerical value of the resulting quotient. After having done this, it is only necessary to mentally determine the correction factor for each individual number of the problem, and apply this correction factor to the computer 10, in accordance with the legends on it. The correction factor to be applied to the slide rule answer is noted over the index 26.

Figures 5, 6:
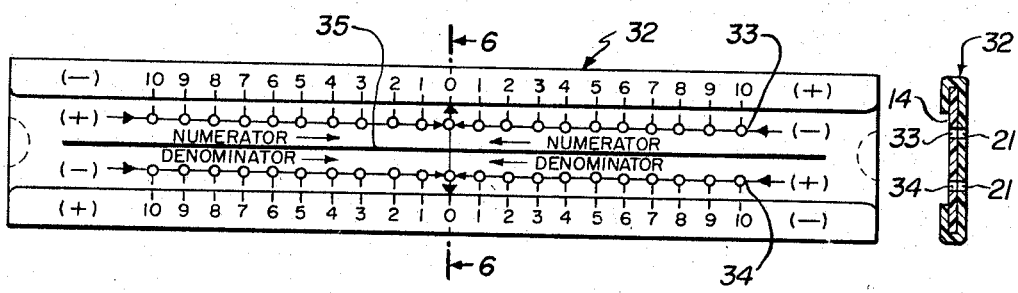
FIGURE 5 is a top plan view of a computer exemplary of a second embodiment of the invention.
FIGURE 6 is an end view of the computer of FIGURE 5.

In FIGURES 5 and 6 there is shown a computer 32 which is of substantially the same construction as the computer 10. Computer 32, however, has two sets of apertures 33 and 34, each of which correspond to the apertures 24 of computer 10. The apertures 33 are used in applying the numerator correction factors. The apertures 34 are used in applying the denominator correction factors. A center line 35 is representative of the line normally drawn between the numerator and denominator of a problem, so that in using the computer 32 the apertures 33 are used when working above the line and the apertures 34 are used when working below the line. The operation of the computer 32 is therefore even more of a mechanical operation than the computer 10.

Still another construction which is not illustrated is to stagger, in step fashion, the apertures 24 on the slide portion 14 so that the apertures form a triangle. A corresponding number of apertures, in the illustrated case, 10 apertures, are formed in the body portion, vertically aligned with the index 20 and individually aligned with respective ones of the apertures 33 and 34. With this construction, a very compact computer can be provided since the spacing between the apertures 33 and 34 can be greatly compressed.

In FIGURE 2 there is shown an adhesive backing 38 on the body portion 12. The adhesive backing can be particularly useful in holding the computer to a desk top or table top so that it can be operated with only one hand. The computer is merely laid on the surface of the desk or table and pressed lightly to stick it to the surface.

Figure 7:
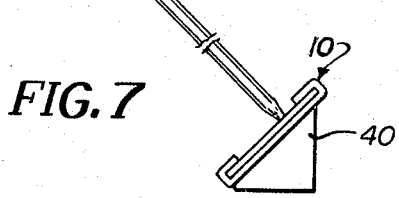
FIGURE 7 is a view illustrating how the computer can be mounted, for desk top operation.

In FIGURE 7 there is shown still another construction for desk top or table top use. In this case, a triangular-shaped support 40 can be affixed to the computer so that it is mounted on a slight angle. In this case also, an adhesive backing can be applied to the under surface of the support 40 to hold it in a substantially fixed position. Alternatively, the support 40 can be weighted.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A computer for use in determining the decimal point location in the solution of mathematical equations comprising: a body portion and a slide portion slidably affixed thereto, a reference index on said slide portion, a zero point and a pair of scales on opposite sides of said zero point on said body portion, each of said pair of scales increasing in value in a direction away from said zero point, one of said pair of scales representing a positive correction factor and the other one of said pair of scales representing a negative correction factor, indexing means for shifting said slide portion relative to said body portion in either direction in accordance with the indicia of said pair of scales to register said reference index with the indicia of the scale representing the positive correction factor to be applied to a number when a positive correction factor is applied to said computer and to register the reference index with the indicia of the scale representing the negative correction factor to be applied to a number when a negative correction factor is applied to said computer, said reference index being in registry with the indicia of said pair of scales representing the correction factor to be applied to the solution when the correction factor for each of the individual numbers of the mathematical equation are applied to said computer, and graphical means on said slide portion separately and pictorially indicating the direction to operate said shifting means to apply said positive and negative correction factors for the individual numbers in the numerators and the denominators of a mathematical equation.

2. A computer, as claimed in claim 1, wherein said shifting means comprise at least one aperture in said body portion aligned with said index, a plurality of apertures in said slide portion, each of which is aligned with one of the digits of said pair of scales, said apertures being adapted to receive an object to shift said slide portion and to engage said aperture in said body portion.

3. A computer, as claimed in claim 1, wherein said shifting means comprise a first and a second aperture in said body portion in spaced relation and aligned with said index, a first and a second row of apertures in said slide portion, each of the apertures in said first and second row being aligned with one of the digits of said pairs of scales and with one of said first and second apertures in said body portion, said apertures in said first and second rows being adapted to receive an object to shift said slide portion and operated in accordance with said graphical means on said slide portion to move said slide portion relative to said body portion to apply said positive and negative correction factors for the individual numbers in the numerator and the denominator of a mathematical equation, respectively.

References Cited

UNITED STATES PATENTS

| | | | |
|---|---|---|---|
| 1,149,516 | 8/1915 | Hirshberg | 235—71 |
| 1,911,581 | 5/1933 | Morse | 235—64.3 |
| 2,328,966 | 9/1943 | Dickson | 235—64.3 |
| 2,765,998 | 10/1956 | Engert | 248—29 |

RICHARD B. WILKINSON, *Primary Examiner.*

W. F. BAUER, L. R. FRANKLIN, *Assistant Examiner.*